United States Patent
Wu

(10) Patent No.: US 10,009,189 B2
(45) Date of Patent: *Jun. 26, 2018

(54) SYSTEM AND METHOD FOR A MANAGED NETWORK WITH QUALITY-OF-SERVICE MANAGEMENT

(75) Inventor: Zong Liang Wu, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 1484 days.

This patent is subject to a terminal disclaimer.

(21) Appl. No.: 12/895,312

(22) Filed: Sep. 30, 2010

(65) Prior Publication Data

US 2011/0113455 A1    May 12, 2011
US 2017/0366367 A9    Dec. 21, 2017

Related U.S. Application Data

(63) Continuation-in-part of application No. 12/027,202, filed on Feb. 6, 2008.

(Continued)

(51) Int. Cl.
    *H04N 7/18*     (2006.01)
    *H04L 12/28*    (2006.01)
    *H04L 12/801*   (2013.01)

(52) U.S. Cl.
    CPC ...... *H04L 12/2801* (2013.01); *H04L 12/2809* (2013.01); *H04L 12/2834* (2013.01);
    (Continued)

(58) Field of Classification Search
    USPC ............................................ 725/82; 370/235
    See application file for complete search history.

(56) References Cited

U.S. PATENT DOCUMENTS

2007/0171842 A1   7/2007 Dow
2008/0002608 A1*  1/2008 Zheng et al. ................. 370/328
(Continued)

OTHER PUBLICATIONS

European Search Report for European Patent Application No. 10821278.8 dated Jan. 4, 2016.

*Primary Examiner* — Kunal Langhnoja
(74) *Attorney, Agent, or Firm* — McAndrews, Held & Malloy, Ltd.

(57) ABSTRACT

Systems and methods for establishing Parameterized QoS flows in a managed network can include a Designated Network Node (like a Network Controller or any network node) discovering a plurality of network nodes. The Designated Network Node discovering one or more of the plurality of network nodes; classifying the discovered network node or nodes based on node type; determining from the classification which node or nodes are designated for supporting Parameterized QoS flows; and invoking a request to a MoCA layer to create Parameterized QoS flows between the network node or nodes classified as designated for Parameterized QoS flows and the source nodes (like BHR and DVRs); wherein the bandwidth designated for the individual Parameterized QoS flows is either a nominal value or actual value specified by the Designated Network Node such that the actual aggregate bandwidth for the Parameterized QoS flows does not exceed the network bandwidth available for actual Parameterized QoS flows; wherein when actual bandwidth is specified for each flow, the Designated Network Node can preempt some PQoS flows in order to release PQoS bandwidth for a new PQOS flow; wherein the Designated Network Node is provisioned with a trusted device list designating nodes for supporting PQoS flows, and preemption rules that can be used for preemption.

34 Claims, 10 Drawing Sheets

Related U.S. Application Data

(60) Provisional application No. 60/931,314, filed on May 21, 2007, provisional application No. 60/901,564, filed on Feb. 14, 2007, provisional application No. 61/247,898, filed on Oct. 1, 2009.

(52) U.S. Cl.
CPC ...... *H04L 12/2861* (2013.01); *H04L 12/2865* (2013.01); *H04L 12/2898* (2013.01); *H04L 47/10* (2013.01); *Y02D 50/30* (2018.01)

(56) References Cited

U.S. PATENT DOCUMENTS

| | | | |
|---|---|---|---|
| 2008/0192752 A1* | 8/2008 | Hyslop et al. | 370/395.21 |
| 2009/0064218 A1* | 3/2009 | Yamagishi | 725/25 |
| 2009/0109977 A1* | 4/2009 | Valluru | 370/395.21 |
| 2010/0023987 A1* | 1/2010 | Bugenhagen | 725/110 |

\* cited by examiner

SYSTEM AND METHOD FOR A MANAGED NETWORK WITH QUALITY-OF-SERVICE MANAGEMENT

CROSS-REFERENCE TO RELATED APPLICATIONS

This application is a continuation-in-part of U.S. application Ser. No. 12/027,202, filed Feb. 6, 2008, which makes reference to, claims priority to, and claims benefit from:

U.S. Provisional Application Ser. No. 60/931,314, filed May 21, 2007; and

U.S. Provisional Application Ser. No. 60/901,564, filed Feb. 14, 2007.

This application also makes reference to, claims priority to, and claims benefit from U.S. Provisional Application Ser. No. 61/247,898, filed Oct. 1, 2009. Each of the above applications is incorporated herein by reference in its entirety.

TECHNICAL FIELD

The presently disclosed method and apparatus relates generally to communication networks, and more particularly, some embodiments relate to scheduling mechanisms to improve bandwidth utilization and Quality of Service management for the networks.

DESCRIPTION OF THE RELATED ART

A home network may include several types of devices configured to deliver subscriber services throughout a home. These subscriber services include delivering multimedia content, such as streaming audio and video, to devices located throughout the home. As the number of available subscriber services has increased and they become more popular, the number of devices being connected within each home network has also increased. The increase in the number of services and devices increases the complexity of coordinating communication between the network nodes. This increase also generally tends to increase the amount of traffic carried on the network.

The network of FIG. 1 is one example of a Multimedia over Coax Alliance (MoCA) network implemented in a home. In this example, a wired communications medium 100 is shown. The wired communications medium might be a coaxial cable system, a power line system, a fiber optic cable system, an Ethernet cable system, or other similar communications medium. Alternatively, the communications medium might be a wireless transmission system. In the embodiment of FIG. 1, the communications medium 100 is preinstalled coaxial cabling deployed within a residence 101.

The network of FIG. 1 comprises a plurality of network nodes 102, 103, 104, 105, 106 in communication according to a communications protocol. For example, the communications protocol might conform to a networking standard, such as the well known MoCA standard. In the example of FIG. 1, the communications protocol specifies a packet based communications system.

In some cases, activity on the network is controlled by a Network Coordinator (NC). In such networks, the NC manages access to the shared communications medium and manages the "quality-of-service" of transmissions on the network. In one such case, one of the nodes is selected to perform the functions of the NC based upon a process defined by the communications protocol. For example, in a MoCA network, the first node to communicate over a communication medium will search to see whether any other node is already performing the functions of the NC. Being the first node, there will not be another node yet on the network. Accordingly, the first node will become the NC. When a second node does a similar search, the first node will be sending out a beacon that will be detected by the second node. An admission process will occur between the nodes according to the admission procedures of the MoCA protocol. The result of the admission process will be the admission of the second node to the network created by the first node. The NC also performs admission procedures when any other new node requests admission to the network. After one or more nodes join the network, a protocol is used to select one of the nodes to become the new NC by using a set of well defined criteria.

In networks employing an NC, the NC schedules network communications between network nodes using a Media Access Plan (MAP). The MAP is sent as a packet. Such MAP packets are sent on a regular basis. MAPs schedule all of the traffic on the medium 100. That includes scheduling the times during which nodes can transmit. Transmit times for data packets are scheduled by the NC in response to reservation requests (RRs) by the nodes of the network. The NC may also schedule control and management packets on its own (without prior RRs).

With continued reference to FIG. 1, a node 102 serves as a network communications module (e.g., a MoCA node) and is coupled to one of the computers 109. Such nodes allow the computers 109 to communicate on the communications medium 100 in accordance with the communications protocol used on the medium 100. A node 106 is shown as a module associated with a television 111 to allow the television to receive and display media streamed from one or more other network nodes. Alternatively, a node might be associated with (i.e., coupled to or integrated into) a speaker or other music or video device 103. A node might also be associated with a module configured to interface with an internet or cable service provider 112, for example to provide Internet access, digital video recording capabilities, media streaming functions, or network management services to the residence 101.

Referring once again to MoCA as an example, a MoCA network utilizes a centralized NC to set up network communications among nodes. Each unidirectional traffic stream of data packets is identified by a "Flow ID." For the purposes of this disclosure, a "flow" is a communication of information organized as a stream of packets transmitted between a transmitting node and at least one receiving node. A flow will typically include a set of related information to be communicated from the transmitting node to the receiving node. The information may be a digital stream of data representing the entire content of a movie to be displayed on a television or other video monitor. The entire stream of data used to stream the movie may be associated with one flow. As such, a unique flow ID will be assigned to the flow and will be associated with all of the packets required to be transmitted from a transmitting node 102 to the receiving node 106 to stream the content of the movie to the receiving node 106 (i.e., all of the packets of the flow).

The transmitting node 102 may set up as many flows as the node 102 requires to communicate with the other nodes of the network. For example, a second flow may be concurrently set up between the node 102 and another node 105 to allow a document to be sent from the personal computer 109 to the personal computer 110.

Some home networks specify quality of service (QoS) parameters to ensure that an appropriate priority is set for the communications that occur on the network. QoS parameters can also be used to ensure that sufficient resources are allocated to the communication of user content without undesirable interruptions or delays. For example, a user that is playing a video game will only have a desirable experience if the commands that he provides are communicated to the game console and then displayed on the monitor or television rapidly. Delays in implementing such gaming commands can significantly impair the quality of the experience. Accordingly, the use of QoS parameters and protocols can help ensure a satisfactory user experience while ensuring that resources are not unnecessarily expended on communicating information more rapidly than is necessary if the content has a high tolerance for latency (i.e., delay).

In a home network, QoS can be classified into two main categories: Parameterized QoS (PQoS) and Prioritized QoS. Parameterized QoS, or PQoS, provides a quantified measure of quality which is defined by a "Traffic Specification" (TSPEC) for each flow. The TSPEC of a PQoS flow defines the requirements and parameters of the flow. The TSPEC of a PQoS flow typically includes information like Peak Rate, Maximum Packet Size, etc. For example, in a MoCA network in which PQoS is implemented, the Peak Rate parameter indicates the maximum amount of data (in bytes) that will need to be transmitted in a very short time interval (like a MAP cycle). Each Parameterized QoS flow must first go through a formal PQoS flow admission process before the flow is allowed to start any data packet transmission. The PQoS flow admission process allows all the nodes involved in the flow to reserve appropriate node level resources (like buffers) and network level resources (like network transmission time and timeliness of such transmissions), in order to guarantee the QoS (that the parameters associated with the TSPEC can be met). Once a PQoS flow is "admitted," the resources necessary to transmit the entire flow from the transmitting node to one or more receiving nodes timely are guaranteed. If a PQoS flow is rejected after the PQoS flow admission process, the PQoS flow cannot be started. On the other hand, for Prioritized QoS, there is no admission process. Each Prioritized QoS flow is assigned a priority by the node sending the flow. Assigning a priority merely places the flow in a priority group. Those flows that are in the group having the highest priority will be allowed to transmit before flows that are in group having a relatively lower priority. However, unlike PQoS flows, prioritized QoS flows are not guaranteed to get the resources necessary to ensure that packets of the flows are transmitted.

Only PQoS flows must go through the PQoS flow admission process to ensure that sufficient network bandwidth and node level resources are reserved for them. This ensures that that the resources required by the PQoS flows will be available when needed during the actual data packet transmission phase. The data packet transmission phase of a PQoS flow is the phase during which the transmit node actually makes RRs for individual data packets or groups of data packets of the flow. In addition, during the data packet transmission phase an RR is "granted" (i.e., scheduled) or discarded by the NC, depending on the availability of network bandwidth for this request. It should be noted that for the purpose of this description, "grants the request" means that the NC assigns a transmission slot to the packet associated with the RR to allow the node that generated the request to transmit the associated packet during the assigned transmission slot in the next MAP cycle. The NC then transmits a MAP to indicate the schedule to all of the nodes of the network, including the requesting node. Each requesting node then transmits the packets according to the schedule indicated by the MAP. Further details regarding MAPs and RRs are provided below.

The data packet transmission phase of a PQoS flow can start only after the PQoS flow admission phase is successful. Since resources are not guaranteed to other (i.e., Prioritized) QoS flows, a node can always down-grade a rejected PQoS flow to a Prioritized QoS flow, and start transmitting the flow with Prioritized QoS level.

Among PQoS flows, each flow may be assigned a priority (similar to a prioritized QoS flow) in order to create further differentiation among the various PQoS flows. However, even if assigned a low relative priority, PQoS flows will always be transmitted before non-PQoS flows, such as prioritized QoS flows, if the bandwidth reserved for PQoS flows has not been completely used by other PQoS flows. If there is insufficient bandwidth reserved for PQoS flows to transmit all of the PQoS packets to be transmitted, then those packets associated with PQoS flows that have higher priorities will be transmitted first. Because admitted PQoS flows are guaranteed, the NC must determine whether it can ensure delivery of all packets of a PQoS flow immediately following an RR. Therefore, the NC reserves a relatively large amount of bandwidth for each PQoS flow that is admitted.

The MoCA network is temporally divided into cycles referred to as MAP cycles. The MAP cycles are divided into time slots. During each MAP cycle, the NC transmits a MAP packet that indicates which nodes will transmit during each time slot of the next MAP cycle (including which slot in the next MAP cycle will contain the next MAP packet). Accordingly, a given MAP cycle includes the communication activity on the channel under the control of the previously sent MAP. That is, each MAP schedules all of the communication activity for the next MAP cycle communication window.

The MAP determines the following information for each packet to be sent in the next MAP cycle: i) packet start time; ii) packet duration; iii) source node; iv) destination node(s); and v) packet QoS level. The combination of a packet start time, the packet duration for the packet to be sent at that start time, and the source node and destination node(s) for that packet are referred to herein as a "transmission slot assignment." It should be noted that as provided herein, packet length is the number of bytes in a packet and packet duration is the amount of time required to transmit that number of bytes.

One particular type of packet that the MAP is responsible for scheduling is the previously discussed RR. Each RR may contain one or more Reservation Request Elements (RREs). Each RRE communicates information regarding a desire on the part of the node from which the RR was sent to transmit one MoCA packet containing one or more Ethernet packets. A MoCA packet can contain more than one Ethernet packet through a process called Aggregation.

From this, it can be seen that RRs are sent by client nodes (i.e. transmit nodes) to indicate that the corresponding client nodes have packets that they wish to send and thus to request that the NC schedule one or more time intervals during a subsequent MAP cycle when the client nodes can send those packets. Accordingly, when the next packet or set of packets of a flow are ready for transmission, the client node waits for the NC to allocate a time when the client node can send an RR. Once the NC has allocated this time, the client node communicates the RR to the NC at the time allocated (i.e., at the packet start time and for the packet length indicated by the MAP). Note that, in some systems, an Orthogonal Frequency Division Multiple Access (OFDMA) or like scheme can be used to allow multiple simultaneous transmissions on a separate group of subcarriers. Therefore, in some applications RRs are transmitted at the same time by different requesting nodes.

The RR allows a client node to communicate to the NC that the client node has data packets it wishes to send. Furthermore, the RR indicates the associated destination node(s), packet length (from which the packet duration can be determined), packet priority, Flow ID and so on for those data packets. The NC uses this information to schedule (or assign) "transmission slots" during which the client node can transmit those data packets it wishes to send. The NC then communicates that schedule by generating and transmitting the MAP having transmission slot assignments for the next MAP cycle. A non-PQoS (i.e. Prioritized QoS) RRE is one for a non-PQoS flow, while a PQoS (i.e. Parameterized QoS) RRE is one for a PQoS flow. Any RRE that the NC cannot schedule in the next MAP cycle is discarded and must be retransmitted by the node from which it originated. In allocating the available transmission slots to the requesting nodes, the NC considers the relative priority of the various transmissions. For example, PQoS flows are given the highest priority and available network bandwidth is allocated first to PQoS flows in the MAP cycle, if any. Next, QoS flows are scheduled. In one example, the QoS flows are prioritized at three levels, high, medium and low priority. In such instances, the NC schedules the QoS flows in accordance with their designated priorities. QoS flows can be prioritized, for example, using a virtual LAN (VLAN).

In order for the NC to guarantee that all admitted PQoS flows will have all of the resources that are required, the NC must determine how much bandwidth will be required by each PQoS flow and within what latency limit. It should be understood that in a network supporting PQoS, any PQoS flow is guaranteed to be sent within a relatively short predetermined amount of time (typically some milliseconds), regardless of the priority assigned to the PQoS flow, once the PQoS is admitted into the network (e.g., by the NC and other nodes involved in this flow). The NC determines how much bandwidth is required by evaluating the set of parameters provided in the TSPEC of the flow. As noted above, the TSPEC typically includes the maximum packet size, peak rate, etc. Typically a network supporting Parameterized QoS uses up to a given percentage of total network capacity for supporting PQoS flows. For example, an NC can reserve 80% of the transmission slots within each MAP cycle for assignment to PQoS flows. By determining how much bandwidth is required for a new PQoS flow and how much has been reserved for existing PQoS flows, the NC can determine if it has enough capacity to admit the new PQoS flow. Once a new PQoS flow is admitted, the NC is committed to ensuring that there is sufficient bandwidth available for the new PQoS flow.

One technique for managing QoS in networking applications is provided by Universal Plug and Play (UPnP), which sets forth a series of networking protocols promulgated by the UPnP Forum. UPnP theoretically permits devices to connect with one another in home networks for data sharing and other communications. UPnP follows published UPnP device control protocols (DCP) built on open communication standards. When connected to a network, the UPnP device automatically announces its network address and supported device and services types, so that other devices can recognize and interact with the device.

FIG. 2 is a diagram illustrating an overview of the UPnP protocol that supports QoS functions for use with audio and video communications. QoS (Quality of Service) for UPnP uses sink device and source device service functions. In the illustrated system, a control point application 125 discovers all the devices and contents on the network, and has the knowledge of the source device, sink device and content to be streamed, along with the content's TSPEC. A control point application 125 requests a QosManager 127 in the network to setup a QoS flow for a traffic stream. The control point application 125 may include an indication of the "QosPolicyHolder service" 128 when requesting the QosManager service. The QosManager 127, requests from the QosPolicyHolder service 128 an appropriate policy for the traffic stream. Based on this policy, the QosManager 127 configures the "QosDevice(s)" 130 to handle the traffic stream. The QosPolicyHolder Service 128 provides the traffic policy for the network on which it resides. It can be used to set the relative importance of a traffic stream.

For Prioritized QoS, the QosPolicyHolder Service 128 defines the Priority of each stream using a "TrafficImportanceNumber"; and tags the packets with this priority. For Parameterized QoS the QosPolicyHolder Service 128 defines the UserImportanceNumber to be used when Preemption may be needed in order to admit a new parameterized QoS flow while the parameterized bandwidth is saturated.

For Prioritized QoS, the QosManager 127 informs each involved node that a Prioritized QoS stream is set up, and informs the source node about the priority of the traffic for tagging. For Parameterized QoS, the QosManager 127 manages network topology, manages the admission process, and manages preemption. For the admission process, the QosManager 127 checks to see whether there is enough network bandwidth, there is enough buffer space in each node involved, and there are enough resources for TSpec Latency.

The QosDevice 130 reports path information, states, and events; and translates UPnP Actions into layer-2 management messaging (MoCA L2ME). The UPnP QoSDevice+MoCA layer form one node.

SUMMARY

One embodiment of the disclosed method and apparatus establishes Parameterized QoS (PQoS) flows in a managed network having a Network Controller (NC), a Designated QoS Manager Node and a plurality of associated network nodes. The functions of the Designated QoS Manager Node may be performed the NC, a Broadband Home Router (BHR) or a home gateway, a DVR, or any other node (thus eliminating the need for a separate Designated QoS Manager Node). In various embodiments, the scheduling operation includes the operations of: (1) the Designated QoS Manager Node discovering one or more of the network nodes; (2) the Designated QoS Manager Node classifying the discovered network nodes based on node type; (3) the Designated QoS Manager Node determining from the classification which nodes are designated for PQoS flows; and (4) the Designated QoS Manager Node invoking a request to a MoCA layer to create PQoS flows for network nodes classified as designated for PQoS flows. The bandwidth designated for the individual PQoS flows is either a nominal value or the actual value of the flow. The value may be specified by the Designated QoS Manager Node. Specifying the value properly ensures that the aggregate bandwidth for the PQoS flows does not exceed the network bandwidth available for PQoS flows. The NC can be a dedicated NC (which can be any node in the network). However, in one embodiment, the Broadband Home Router is selected to serve as the NC. In another embodiment, a Digital Video Recorder (DVR) is selected to serve as the NC.

In various embodiments, the process can be performed on multiple nodes such as, for example, when multiple nodes are added to the network either on startup or otherwise. Likewise, the process can be performed on a single node in addition to the NC, such as when the network is initiated with a single node or when a single node is added to the network. Where one or more nodes are added to a network for which PQoS bandwidths have already been specified with actual values, the NC may preempt some existing PQoS flows in order to admit a new PQoS flow, such that the aggregated PQoS flow rate does not exceed the PQoS bandwidth for the network.

In one embodiment, when a network node is removed from the network, the NC issues a request to the MoCA layer to delete a PQoS flow for the removed network node. When the number of nodes sharing the PQoS bandwidth has changed (e.g., been reduced when a node is removed or increased when a node is added to the network), the bandwidth designated for each individual PQoS flow is updated such that the aggregate bandwidth for the remaining PQoS flows does not exceed the network bandwidth available for PQoS flows.

The network node types can include in various embodiments a Digital Video Recorder (DVR) (HD or SD), a Set-top Box (STB) (HD or SD), an Ethernet to Coax (or MoCA) Bridge (ECB) (premium or retail), and/or a Broadband Home Router (BHR).

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus is described in detail with reference to the following Figures. The drawings are provided for purposes of illustration only. Accordingly, these drawings shall not be considered limiting of the breadth, scope, or applicability of the claimed invention. Note that for clarity and ease of illustration, these drawings are not necessarily made to scale.

The Figures are not intended to be exhaustive or to limit the claimed invention to the precise form disclosed. It should be understood that the disclosed method and apparatus can be practiced with modification and alteration, and that the claimed invention should be limited only by the claims appended hereto.

DETAILED DESCRIPTION

Figure 1:
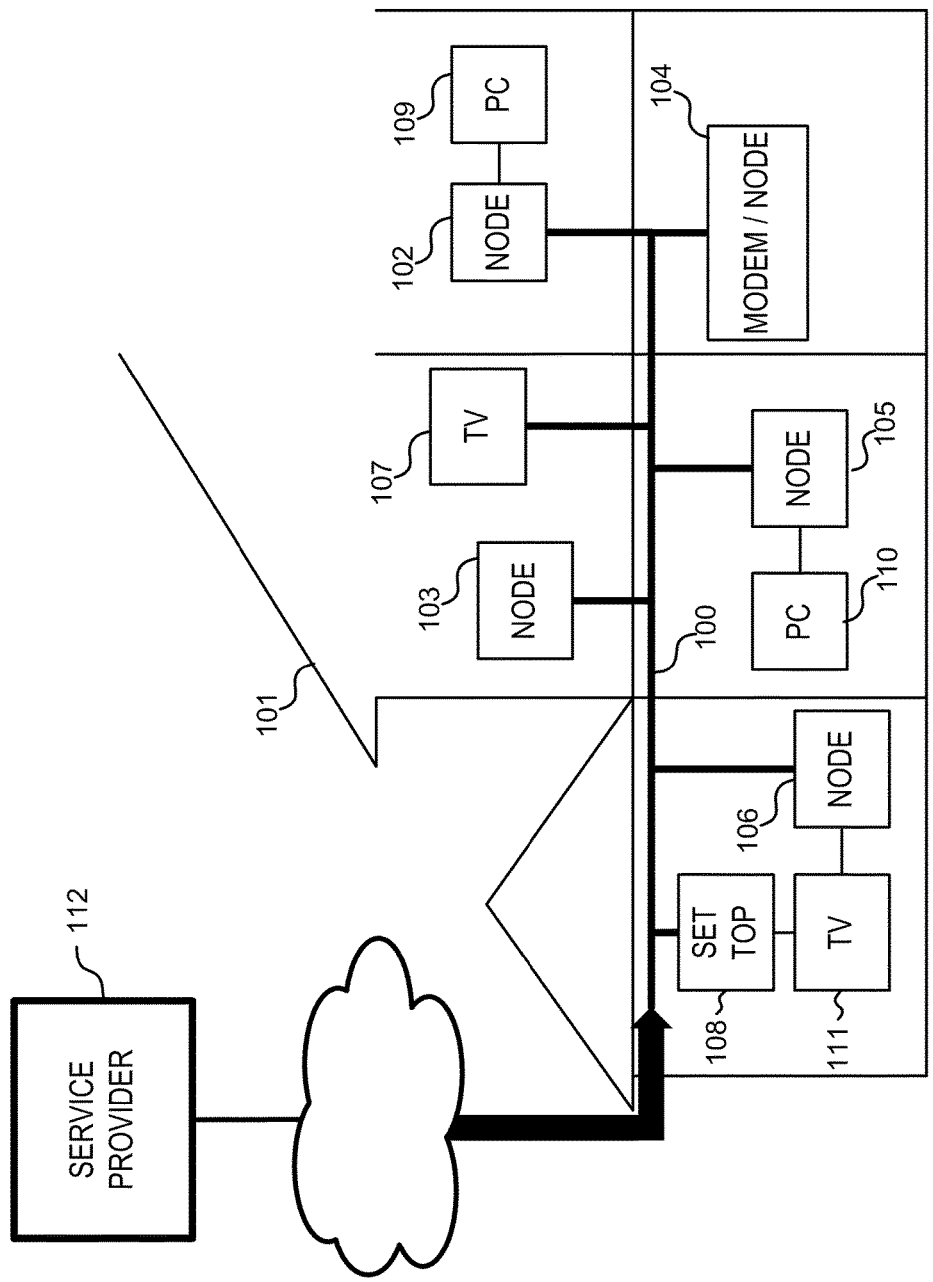
FIG. 1 illustrates an example of one environment in which some embodiments of the disclosed method and apparatus may be implemented.
Figure 2:
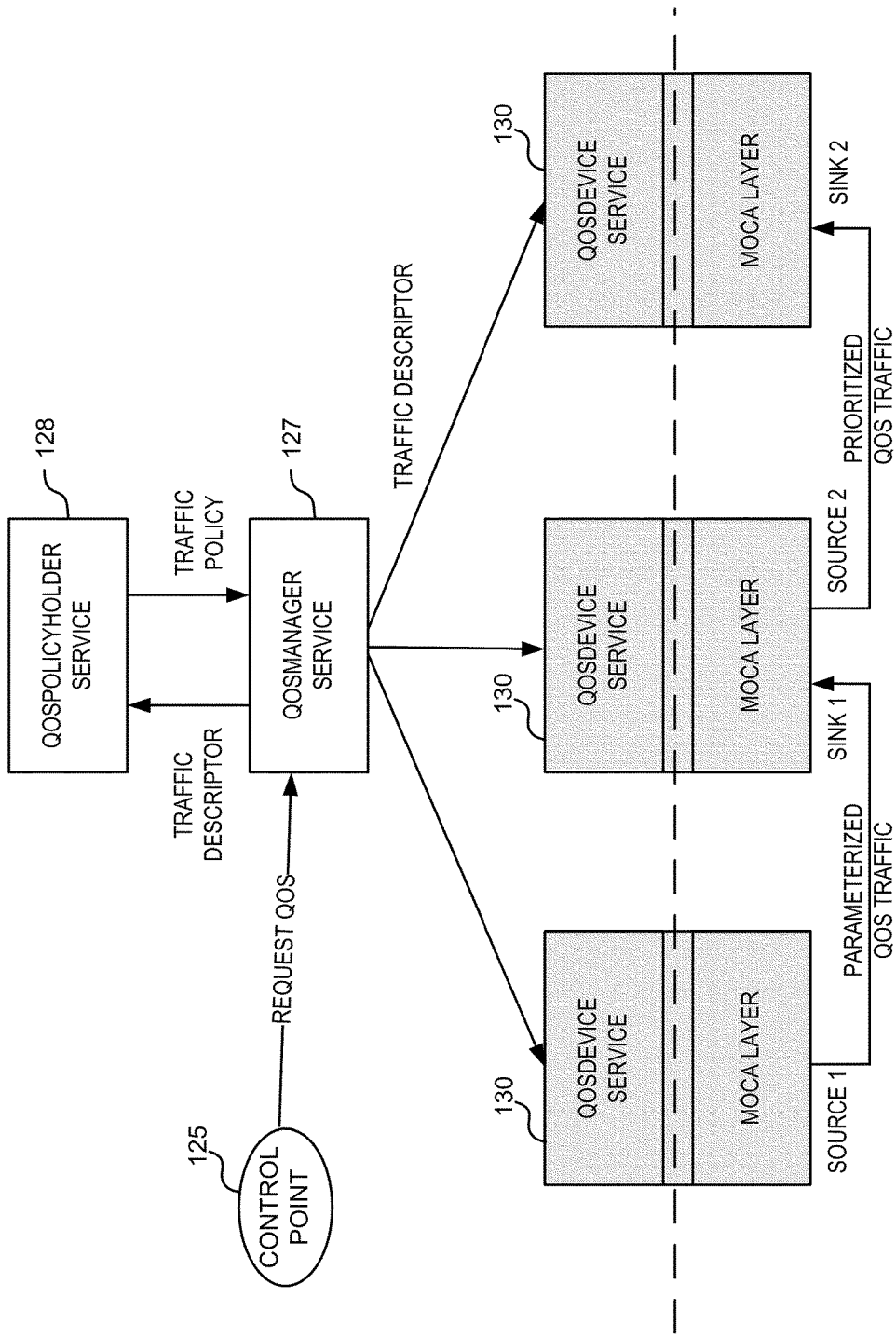
FIG. 2 is a diagram illustrating an example of a system for performing UPnP QoS for a network.
Figure 3:
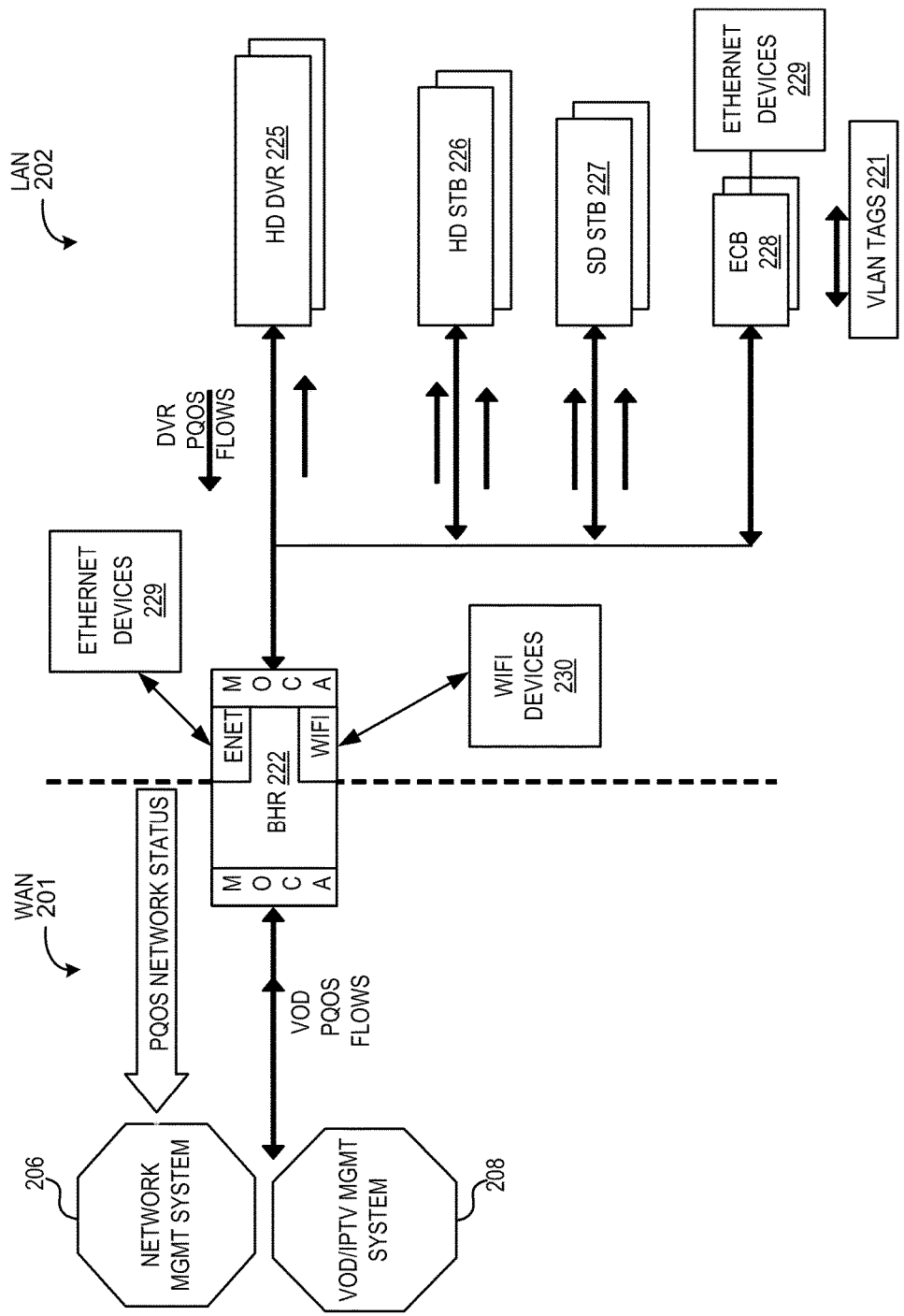
FIG. 3 is a block diagram illustrating an example of a home network connected to a WAN, the home network having a BHR and a plurality of nodes in accordance with one embodiment of the systems and methods described herein.

Various embodiments of the disclosed method and apparatus allow the implementation of Quality of Service (QoS) flows for network traffic. FIG. 3 is a diagram illustrating an example of a network with which systems and methods described herein can be used. In this example, a plurality of network devices communicate with one another using Multimedia over Coax Alliance (MoCA) protocols. Particularly, this example illustrates a MoCA network having a plurality of audio/video (AV) components in a Local Area Network (LAN) 102 connected to a Wide Area Network (WAN) 201 via a Broadband Home Router (BHR) 222. In this example, the AV components include a plurality of high definition digital video recorders (HD DVRs) 225, high definition set top boxes (HD STBs) 226 and standard definition set top boxes (SD STBs) 227. This example home network also includes a plurality of Ethernet devices 229 connected to the MoCA network via an Ethernet to Coax Bridge (ECB) 228.

The BHR 222 is a broadband router that serves as a gateway between the in-home LAN 202 and the external WAN 201. The in-home LAN 202 is a MoCA network. The external WAN 201 may be either another MoCA network, or a network using another technology. The BHR 222 can also serve as a Network Controller (NC), providing NC functions to the MoCA LAN network. AV content from service providers or other sources in the WAN 201 enter the home via the BHR 222. In addition to the MoCA interface, the BHR 222 can also include Ethernet and WiFi communication ports to allow Ethernet Devices 229 and WiFi Devices 230 to exchange data with the BHR 222. HD DVRs 225 can be configured to receive AV content, including video on demand (VoD) content or internet protocol television (IPTV) content and can record AV content for playback. In a networked environment, HD DVRs 225 can playback recorded content locally, or transfer the content to another device on the network for playback. Accordingly, an HD DVR 225 can be configured to send Parameterized QoS (PQoS) flows across the WAN 201.

HD STBs 226 and SD STBs 227 are configured to receive AV content, such as VoD content or DVR content for presentation on a connected television or like device. In this example HD STBs 226 and SD STBs 227 do not include DVRs, so they do not record AV content. Accordingly, it is not expected that HD STBs 226 or SD STBs 227 would use an outbound PQoS flow. However, because they may receive AV content such as VoD and DVR content, they benefit from and are configured to receive an inbound PQoS flow.

In the WAN 201, there are systems such as a VoD/IPTV management system 208 that is configured to generate content, such as VoD content, and send this content to the devices in LAN 202 for playback. Accordingly, PQoS flows can be established between the VoD/IPTV management system 208 and receiving devices such as HD DVR 225 and HD STBs 226 and SD STBs 227. A network management system 206 is provided to manage VoD/IPTV flows across the WAN 201 and LAN 202.

Accordingly, in this example, there are two types of Multiple Service Operator (MSO) flows that can use PQoS protection. These are flows from the WAN VoD/IPTV management system 208 and flows from the HD DVR 225. Flows from the WAN VoD/IPTV management system 208 in this example go through the BHR 222 to the STBs such as the HD DVR 225, HD STBs 226 and SD STBs 227. Flows from the HD DVR 225 are from the HD DVR 225 to the HD STBs 226 and SD STBs 227. Also, the system supports reverse direction control signals associated with the MSO flows.

In one embodiment, the desired PQoS flows are set up according to a static architecture. For example, the PQoS flows for the devices are set up upon device discovery in accordance with the device type. By way of further example, nominal PQoS flows are created upon discovery and available PQoS bandwidth is shared among devices that need PQoS flows. In such an embodiment with setup upon discovery, there is no need for interaction between existing device higher-layer software and the MoCA layer. Because the PQoS flows are set up upon discovery based on device type, the higher layer does not need to tell the MoCA layer to create a PQoS flow.

Figure 4:
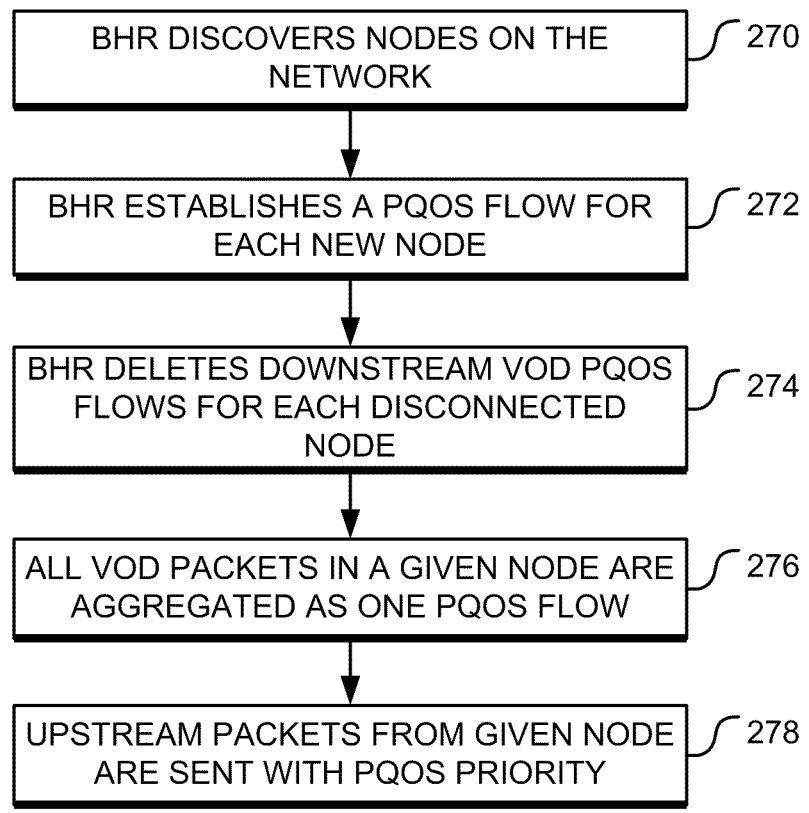
FIG. 4 is a diagram illustrating an example process for assigning PQoS flow(s) upon node discovery in accordance with one embodiment of the systems and methods described herein.

FIG. 4 is a diagram illustrating an example process for establishing PQoS flows for IPTV and VoD flows in accordance with one embodiment of the systems and methods described herein. Particularly, in terms of the example configuration shown in FIG. 3, FIG. 4 illustrates an example of establishing and managing IPTV and VoD PQoS flows from the WAN 201 through the BHR 222 to the DVRs 225 and STBs 226, 227. At operation 270, the BHR 222 discovers the nodes on the network. This can be done upon network power-up and updated upon a network topology change (as new nodes are added to the network and as existing nodes are powered down or disconnected). The discovery can be done either at a high-layer with DHCP-option 60, or at layer-2 with a MoCA discovery protocol, or as otherwise appropriate for the network.

Upon discovery, the BHR 222 determines the device type so that it can set up the desired PQoS flow(s) based on device type. The BHR 222 determines all PQoS flows desired for the network nodes so that it can assign PQoS bandwidth in a way that shares the available bandwidth across the devices needing PQoS flows. In one embodiment, the bandwidth is divided evenly or approximately evenly among the nodes such that each node gets a nominal bandwidth for PQoS flows. In another embodiment, the devices can be assigned relative priorities (for example, based on device type) and bandwidth assigned on a prioritized basis.

At operation 272, the BHR 222 establishes the desired PQoS flows for the devices that are anticipated to use PQoS flows based on the discovery operation. For example, it is anticipated that an HD DVR will support a downstream PQoS flow to receive VoD data (and in some embodiments also the outbound PQoS flow to send recorded content to other STBs). In this example, relating to IPTV/VoD flows, the BHR 222 establishes the downstream PQoS flows for each STB and the associated upstream control flow. Accordingly, based on the network node type (DVR, STB, etc.) the BHR 222 determines whether the node is of a class of nodes that supports PQoS flows.

When a device is removed from the network, the BHR 222 discovers this and disconnects the PQoS flow(s) for the removed device. In one embodiment, the BHR 222 calls to the MoCA layer to delete downstream PQoS flows and the upstream control flow. PQoS bandwidth that is freed up by this disconnection can be reallocated to the remaining PQoS flows. This is illustrated at 274.

At operation 276, the BHR 222 views all downstream IPTV/VoD PQoS flows as one aggregated flow. Polices are then set for the aggregate to limit the downstream IPTV/VoD bandwidth to a preset level of Mb/s. The packets are then sent with PQoS priority, as noted in operation 278.

Figure 5:
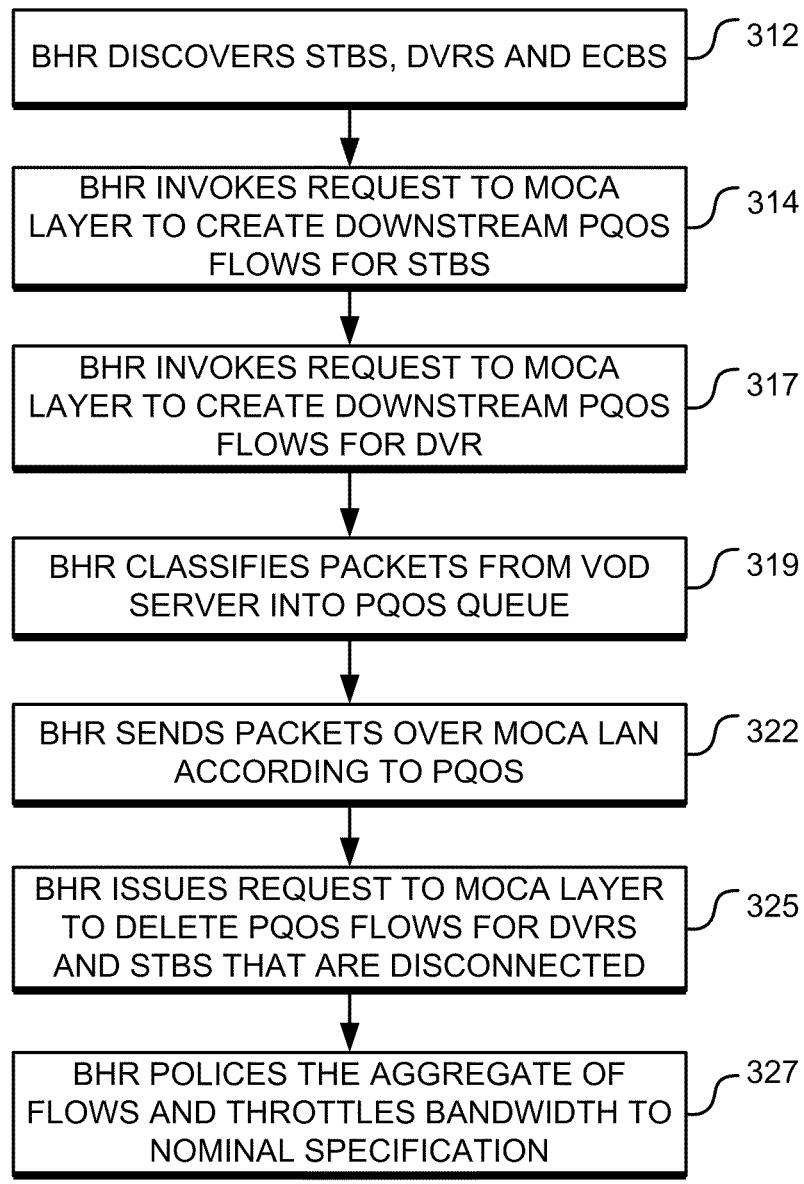
FIG. 5 is a diagram illustrating another example process for assigning PQoS flow(s) upon node discovery in accordance with one embodiment of the systems and methods described herein.

FIG. 5 is a diagram illustrating another example of setting up PQoS flows for IPTV/VoD flows in accordance with one embodiment of the systems and methods described herein. Particularly, in terms of the example configuration shown in FIG. 3, FIG. 5 illustrates another example of establishing and managing IPTV and VoD PQoS flows from the WAN 201 through the BHR 222 to the DVRs 225 and STBs 226, 227. Referring now to FIG. 5, at operation 312, the BHR 222 discovers the nodes on the network, including DVRs 225, STBs 226, 227 and ECBs 228. This can be done upon network power-up and updated upon network topology change. The discovery can be done either at high-layer with DHCP-option 60, or at layer-2 with a MoCA discovery protocol, or as otherwise appropriate for the network. Assumptions can be programmed into the BHR 222 for VoD flow assignment. For example, each STB can have one VoD flow at any time; there can be 2 types of STB—HD or SD; there can be more than one DVR in a home; and ECBs are not permitted to set up a PQoS flow.

Figure 6:
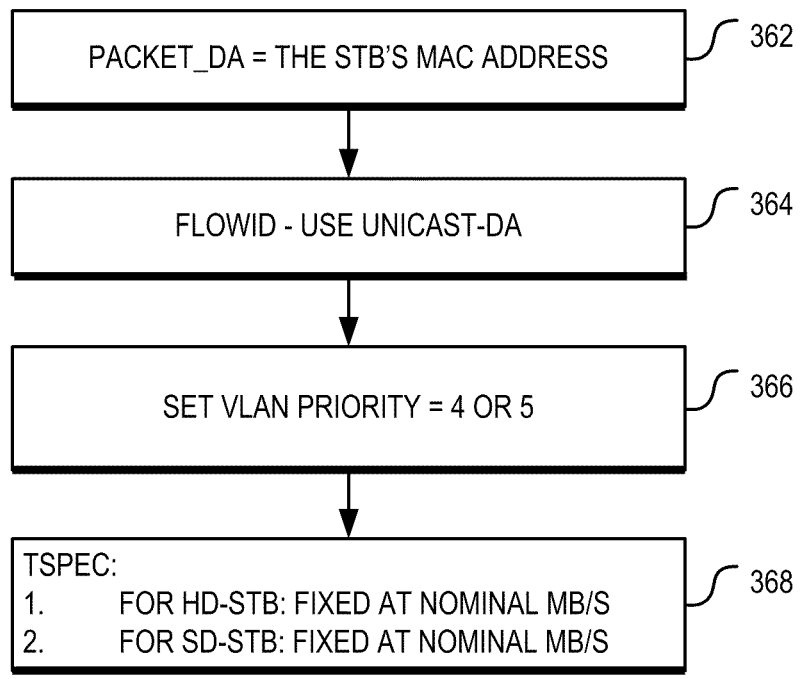
FIG. 6 is a diagram illustrating an example process for a BHR to invoke a MoCA control flow request to its MoCA layer to create a downstream pQoS flow in accordance with one embodiment of the systems and methods described herein.

At operations 314 and 317, the BHR 222 invokes a request to the MoCA layer to create the downstream PQoS flows from the BHR to each of the DVRs 225 and STBs 226, 227 discovered on the network. In one embodiment, for each of the DVRs 225 and STBs 226, 227, the BHR 222 invokes a MoCA PQoS flow control request. An example of this is illustrated in FIG. 6, wherein the BHR 222 invokes a MoCA PQoS flow control request to its MoCA layer to create a downstream pQoS flow. With reference to FIG. 6, in step 362, the destination address of the packet is set to the STB's Media Access Control (MAC) address. In one embodiment, the flow ID is set to the unicast destination address (step 364). At operation 366, a virtual LAN (VLAN) Priority is set to 4 or 5, depending on the value actually used by the VoD/IPTV management system 208. At operation 368, the "Traffic Specification" (TSPEC) is set as follows: 1) for HD-STBs and SD STBs, the TSPEC is fixed at a nominal value for the HD-STBs and SD STBS respectively, in units of Mb/s as determined to be appropriate by the BHR 222. In one embodiment, the "nominal" value is chosen to be small enough so that the sum of all PQoS flows will not exceed the network capacity for PQoS. In addition to the downstream data flows, back-channel control flows are also created for the devices. In one embodiment, all upstream packets from a given STB/DVR to the VoD/IPTV management system 208 are sent with prioritized QoS with high priority or with a separate pQoS flow to guarantee that back-channel control messages are communicated to the VoD/IPTV management system 208 promptly.

Returning now to FIG. 5, at operation 319, the BHR 222 classifies packets from the VoD/IPTV management system 208 into the appropriate PQoS queue according to their destination address. At operation 322, the classified packets are sent over the MoCA LAN to the appropriate destination node with appropriate QoS level (PQoS QoS for VoD/IPTV packets).

When a STB or DVR is powered down or disconnected from the network, the PQoS flows for that device are terminated. This is illustrated by operation 325. In one embodiment, the BHR 222 issues a request to delete the flow associated with the terminated device. The request is issued to the MoCA LAN. With the number of PQoS flows changed, the BHR 222 examines the downstream IPTV/VoD PQoS flows to determine the aggregated flow requirements, and sets the polices for the aggregate. In particular, the BHR 222 limits each of a set of aggregated downstream IPTV/VoD flow bandwidths to a level (i.e., a number of Mb/s) that, in the aggregate, will not exceed the maximum permissible total PQoS bandwidth. This is illustrated at operation 327.

In various embodiments, the process for setting up PQoS flows for DVR-to-STB/DVR flows is performed in a similar fashion. PQoS flows can be established between a DVR and each of the STBs (including other DVRs) on the LAN 202. This is done to allow PQoS flows to be established for playback of recorded content from a DVR to a given STB. As is the case with embodiments of the IPTV/VoD flows, embodiments of DVR flows can allow control and data packets to be aggregated as one PQoS flow. Likewise, all upstream packets from a given STB/DVR to a DVR are sent with prioritized QoS with high priority or with a separate pQoS flow.

Figure 7:
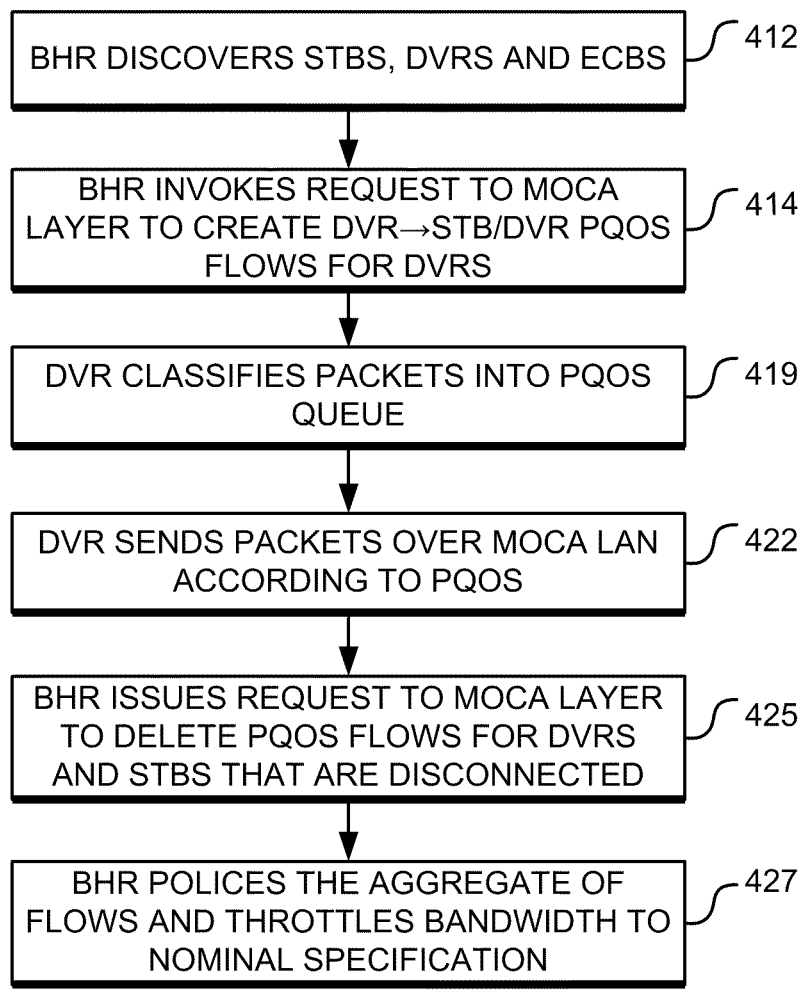
FIG. 7 is a diagram illustrating another example process for assigning PQoS flow(s) upon node discovery in accordance with one embodiment of the systems and methods described herein.

FIG. 7 is a diagram illustrating an example process for setting up a DVR flow in accordance with one embodiment of the systems and methods described herein. In particular, FIG. 7 illustrates an example of establishing and managing DVR PQoS flows from DVRs 225 to STBs 226, 227, which can also include DVRs. The illustration in FIG. 7 is given in terms of the example configuration shown in FIG. 3.

At operation 412, the BHR 222 discovers the nodes on the network, including DVRs 225, STBs 226, 227 and ECBs 228. This can be done upon network power-up and updated upon network topology change. The discovery can be done either at high-layer with DHCP-option 60, or at layer-2 with a MoCA discovery protocol, or as otherwise appropriate for the network. Assumptions can be programmed into the BHR 222 for VoD flow assignment. For example, each STB can have one DVR flow at any time; and ECBs are not permitted to set up a PQoS flow for PCs.

At operation 414, the BHR 222 invokes a request to the MoCA layer to create a DVR PQoS flow from each of the DVRs 225 to each of the STBs 226, 227 discovered on the network. This process can be performed in the manner as described above with reference to FIGS. 4 and 5. Each DVR transmitter classifies packets from the DVR into the appropriate PQoS queue according to the packets' destination address and the classified packets are sent over the MoCA LAN to the appropriate destination node, at PQoS flow QoS level. This is illustrated by operations 419 and 422.

When a STB or DVR is powered down or disconnected from the network, the PQoS flows for that device are terminated. This is illustrated by operation 425. In one embodiment, the BHR 222 issues a request to the MoCA LAN to delete the PQoS flow associated with the terminated device. With the number of PQoS flows changed, the BHR 222 examines the DVR PQoS flows to determine the aggregated flow requirements, and sets polices for the aggregate. Particularly, the BHR 222 limits the aggregated DVR flow bandwidths to a level (i.e., number of Mb/s) that, in the aggregate, will not exceed the maximum permissible total PQoS bandwidth. This is illustrated at operation 427.

In some embodiments, DVRs on the network communication with each other to control or limit the total amount of active DVR flows at any given time. In one embodiment, DVR flows are set up with nominal TSpec (e.g. 1 Mb/s), but various sizes and numbers of actual DVR flows can be used, as long as their actual aggregate bandwidth is below what the MoCA network can support.

Various embodiments can be implemented to provide higher priority for MSO devices than for other third-party devices. Accordingly, one embodiment prevents internet traffic from disturbing MSO's PQoS flows by allowing only MSO's STBs, DVRs, and BHRs to have PQoS flows. In one process, MSO status of the nodes (e.g., MSO vs. non-MSO) is discovered and identified during the discovery process and their MAC addresses noted. Non-MSO nodes are permitted to use only prioritized QoS over MoCA, with retail ECBs and Ethernet nodes behind them being examples of such non-MSO nodes. To prevent a non-MSO node from being viewed as an MSO node, the BHR 222 can be provisioned with a layer-2 PQoS Policy Holder. The system can use a pQoS access list, which provides a list of MAC addresses of MSO's nodes that are allowed to use PQoS, and only the nodes whose MAC address are in the pQoS access list are allowed by the NC to set up a pQoS flow.

PQoS flows can also be set up in a dynamic fashion, allowing the network to set up the flows on an as-needed basis, rather than assigning nominal bandwidth across multiple nodes upon discovery. An example of the process for establishing an IPTV/VoD session between a STB (which can be a standard STB, or STB with DVR) and the VoD/IPTV management system 208 is now described.

The BHR 222 and at least one STB 225, 226, 227 are powered on and form a MoCA1.1 network, with the BHR 222 is selected as the NC. In one embodiment, the BHR 222 shall always be configured as a preferred NC, and all other MoCA nodes are configured as non-Preferred NCs. Irrespective of which one of the BHR 222 or the STB is powered on first, the BHR 222 will eventually become the NC of the MoCA LAN 202.

The BHR 222 sets up an upstream PQoS flow from the STB to the BHR for control/management messages and begins the layer-2 discovery process to discover the capability of the STB. The STB downloads the TV guide, VoD menu etc. with Transmission Control Protocol/Internet Protocol (TCP/IP) sockets (3 TCP ports are involved for TV guide, Menu, and Profile). The upstream TCP traffic is protected with the upstream PQoS flow set up earlier.

The user browses the VoD menu and selects a program to play. The VoD flows are assumed to be multicast. The multicast management is done in accordance with the well known Internet Group Management Protocol (IGMP). The STB's high layer software sends a "JOINT" request to the BHR 222, which is a proxy for the MoCA LAN. Upon receiving the first JOINT message, the BHR 222 high layer software will generate a "CreateFlow" request to the MoCA layer software Application Programming Interface (API), to set up a downstream PQoS flow from the BHR 222 to the STB. Each VoD flow Ethernet packet uses a multicast destination MAC address. The downstream control messages related to the VoD flow are treated as part of the flow for their transmission over the MoCA LAN, although they have a unicast destination MAC address. (The BHR puts both the VoD data packets and the control packets into the same PQoS queue for the MoCA LAN port).

The TSpec of the flow is then determined. If the BHR is capable of determining the TSpec of the flow through some high layer protocol, either from the VoD server or the STB, this TSpec will be used. Otherwise, the BHR uses HD-TSpec if the STB is HD, or SD-TSpec if the STB is SD. The BHR makes this determination based on information it received about the node through the node capability discovery previously performed.

The BHR sends a JOINT request to the VoD server which will then start to send the VoD data to the BHR/STB (after appropriate possible authentication and Digital Rights Management (DRM) related processes). DRM messages are embedded in the VoD data flow and are transparent to the BHR.

In various embodiments, the VoD data and control packets are VLAN-tagged. In an alternative embodiment, the VoD data and/or control packets are not tagged. On the MoCA WAN link, the downstream packets comprise:
1. The downstream VoD data and associated control packets using the well known User Datagram Protocol (UDP);
2. The downstream traffic related to the TV guide, Menu, and Profile using TCP/IP;
3. The internet packets bound to ECBs and Internet Protocol (IP) nodes behind them running internet applications;
4. The internet packets bound to a wireless 802.11x port and wired Ethernet ports of the BHR.

The Optical Network Terminal (ONT) classifies these downstream packets using the Differentiated Services Code Point (DSCP) field and sends them to the MoCA WAN port. The BHR performs network address translation (NAT) on these packets and forwards them to the appropriate port of the BHR.

The BHR MoCA port driver classifies the packets for the MoCA LAN network by using the DSCP or the destination MAC address of the packet. The BHR MoCA port driver puts them into four QoS queues in the BHR system memory: (1) PQoS queue, (2) High Priority Queue, (3) Middle Priority Queue, and (4) Low Priority Queue. Because the MoCA WAN link and the LAN are concurrent and asynchronous, sufficient buffer space should be provided for the data link from MoCA WAN port to MoCA LAN port, in order to avoid data loss due to buffer overflow.

When the BHR high layer software detects that the VoD flow has stopped, either using IGMP or a time-out mechanism, the BHR high layer software will generate a "DeleteFlow" request to the MoCA layer API. That request will signal the MoCA NC and related nodes to release the network level and node level resources associated with this flow.

If, during the VoD session, another STB is admitted to the MoCA LAN network, the MoCA NC in the BHR will detect the admission through the MoCA protocol, initiate the layer-2 capability discovery process on the new node, and set up an upstream flow for the new STB.

If the new STB requests the same program that the first STB has been receiving, the new STB sends an IGMP JOINT request to the BHR. The BHR then invokes a MoCA API "UpdateFlow" with the Egress node being changed from the first STB to FFFF (broadcast to all MoCA nodes). It should be noted that MoCA does not support true multicast. Rather, MoCA broadcasts all of the multicast packets. The TSpec remains the same. The MoCA LAN port will broadcast the flow instead of unicasting it. Egress filtering mechanisms for other MoCA nodes (STBs, DVRs, and ECBs) can also be implemented. In some embodiments, ECBs are configured to filter out all VoD flows. For multicast mode, the BHR can be configured to only invoke DeleteFlow to layer-2 if all MoCA receivers have dropped from the multicast VoD group.

For downstream traffic in the MoCA WAN link, the ONT node can be configured to also support multiple QoS queues. For example, a PQoS queue for all the downstream VoD data and related control packets, and a Non-PQoS queue for all other internet traffic. This enables the MoCA WAN link to support PQoS correctly.

On the MoCA WAN link, the upstream traffic includes:
1. The upstream VoD associated control packets using UDP;
2. The upstream traffic related to the TV guide, Menu, and Profile using TCP/IP;
3. The upstream internet packets from ECBs and IP nodes behind (i.e., further upstream) them running internet applications. These packets may be VLAN-tagged in some embodiments. In other embodiments the packets may not be VLAN-tagged. In yet other embodiments, the packets may be tagged with inappropriate values. Their DSCP field are also be set to inappropriate values in some embodiments; and
4. The upstream internet packets from a wireless 802.11x port and from wired Ethernet ports of the BHR.

In the MoCA LAN, upstream traffic from STBs is PQoS protected with a PQoS flow set up from each STB and the BHR. Accordingly, in the MoCA LAN, upstream internet traffic from ECBs will not impact the VoD related control messages from the STBs. However, for the MoCA WAN link, the BHR MoCA WAN port should be able to differentiate STB related upstream traffic from internet traffic of ECBs and other BHR ports (wired and wireless). The BHR can already separate upstream MoCA LAN traffic from other upstream traffic by using a BHR port based method. Because MoCA LAN upstream traffic now also includes upstream internet traffic from ECBs, and these packets may not be VLAN-tagged or DSCP-marked properly, the MoCA WAN port driver must classify all upstream packets from the MoCA LAN port by using their source address (MAC or IP). The MoCA WAN port driver will classify all upstream packets into four queues: (1) PQoS, (2) High priority, (3) Middle Priority, (4) Low Priority. In an alternative embodiment, two queues may be enough: (1) PQoS and (2) Non-PQoS.

In some embodiments, an internet application (like photo uploading or web hosting) involves a large amount of upstream data. In order to guarantee the QoS for VoD data and related control messages, both the ONT and BHR preferably support at least two queues as described above.

Figure 8:
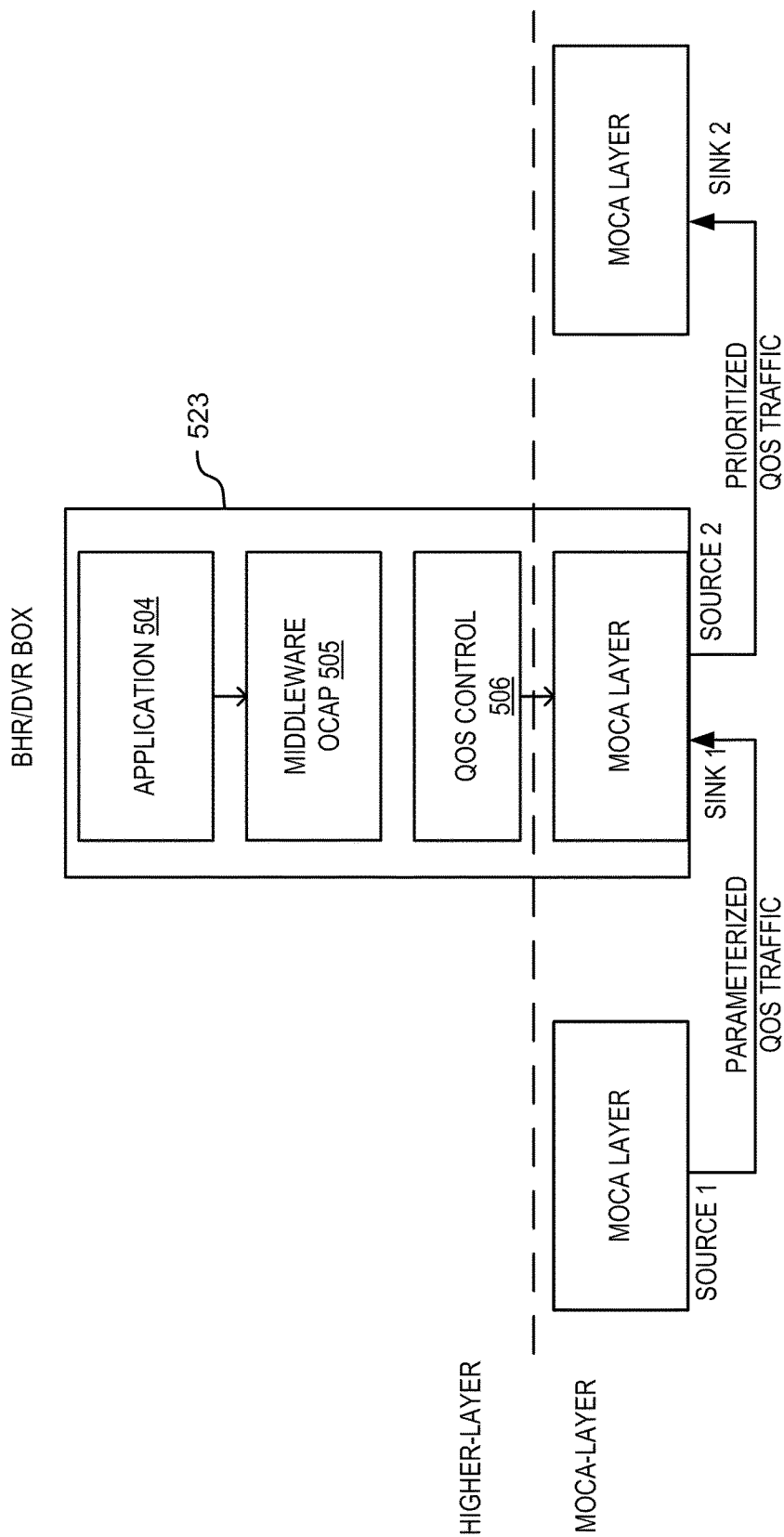
FIG. 8 is a diagram illustrating an architecture for establishing a PQoS flow in accordance with one embodiment of the systems and methods described herein.

In some of the embodiments described above, the architecture establishes nominal PQoS flows for the network nodes that are anticipated to use such flows. In some of the other embodiments described above, the architecture either relies on the NC or BHR to snoop the packets. In an alternative embodiment, the NC or BHR rely on the higher layer application software that manages the video flows to determine whether a PQoS flow should be started or stopped. In embodiments following in which nominal PQoS flows are established, the architecture does not need to rely on any interaction between existing DVR/STB/BHR higher-layer SW and the MoCA layer. In other words, the higher-layer does not tell MoCA layer if a PQoS flow is being created or deleted. Instead the PQoS flow is created upon discovery by the NC or BHR, depending on the node. An example of this is illustrated at FIG. 8, wherein a subject node 523, which includes applications 504, middleware 505 and QoS control 506, does not require the application 504 to interact with higher-layer software (i.e., QoS control 506) or the MoCA layer.

In a network that has no BHR, one of the DVRs in the network manages the PQoS flows from each DVR to each STBs (i.e., discovering the network, setting up the PQoS flows etc.)

Figure 9:
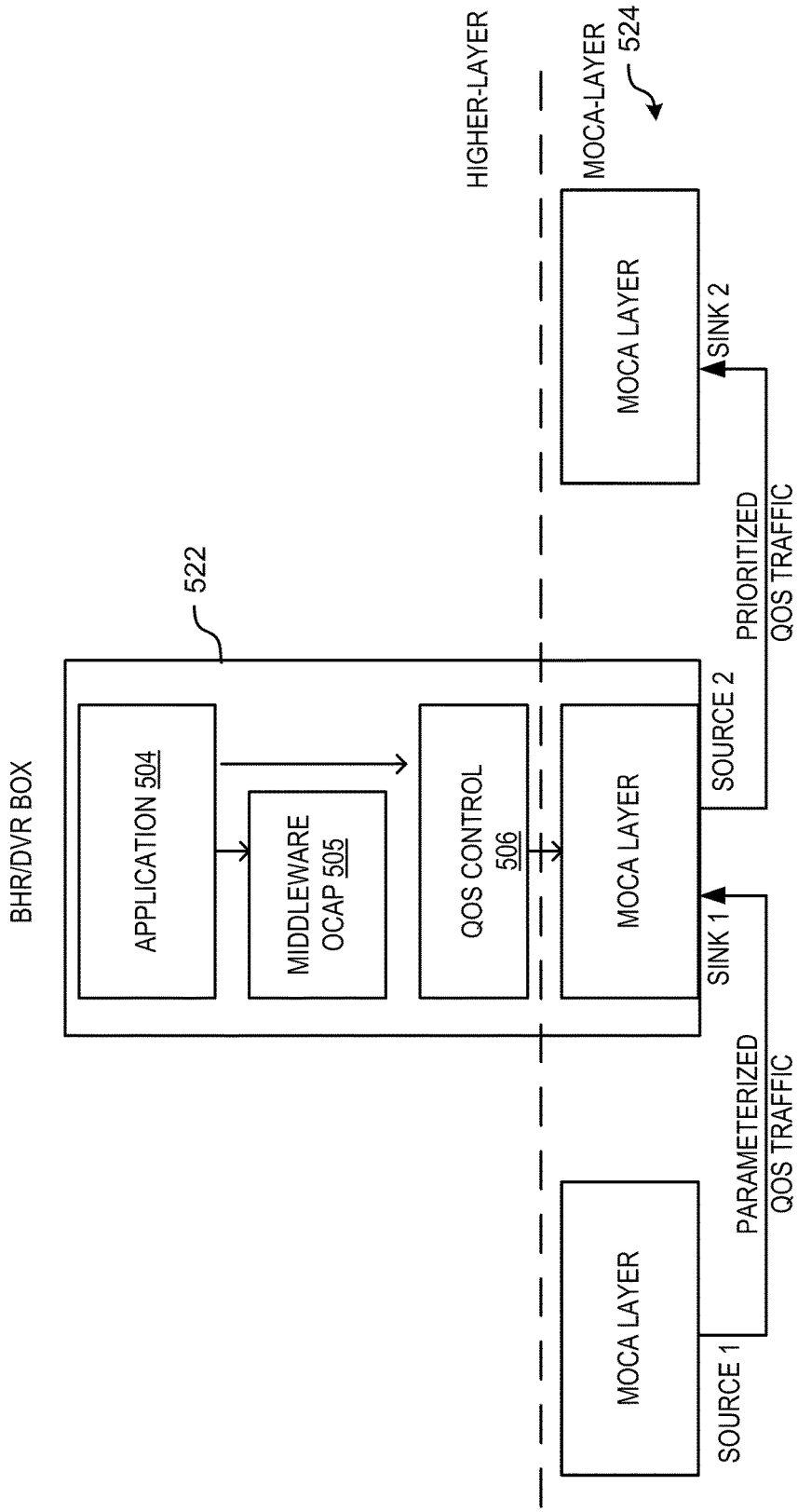
FIG. 9 is a diagram illustrating another architecture for establishing a PQoS flow in accordance with one embodiment of the systems and methods described herein.

In contrast, in the scenario in which the NC or BHR snoops the packets, the architecture provides an interaction between DVR/STB/BHR higher-layer SW and the MoCA layer. An example of this is illustrated in FIG. 9, wherein the subject node 523, which also includes applications 504, middleware 505 and QoS control 506, allows the application 504 to interact with higher-layer software (i.e., QoS control 506) to initiate a QoS flow. With such an architecture, the NC or BHR snoops VoD requests from STBs and DVRs, so that the BHR creates (or deletes) a PQoS flow when a VoD flow is actually started (or stopped), with HD or SD TSpec. Likewise, the DVR creates (or deletes) a PQoS flow when a DVR flow is actually started (or stopped) with HD or SD TSPEC. If a PQoS flow cannot be created due to a bandwidth limitation, the MoCA entry node will inform its higher-layer, which in turn informs the user.

In this scenario, rather than determining PQoS flows upon discovery, the BHR in the case of a WAN-BHR-STB flow, snoops the VoD request from the STBs and DVRs and creates (or deletes) a PQoS flow when the flow is actually started (or stopped). In the case of a DVR flow, the source DVRs or sink STB/DVRs application invoke the PQoS flow and create (or delete) a PQoS flow when the flow is actually started (or stopped).

The QoS architecture can include a "policy" that can be contained in the nodes to manage node behavior in accordance with the architecture. For example, a QoS policy can be contained in the BHR or, in the absence of the BHR, the policy can be contained in one of the DVRs. Configuration of the policy can be done through a Network Management System (NMS) by the service provider's server (i.e., in the WAN) or by directly configuring the BHR at the time the BHR is installed.

In one embodiment, the policy includes an Access Control List. The list includes MAC addresses of devices from and to which a PQoS flow is allowed to be created. These devices include, for example, the NC, the BHR and the DVRs. The policy can also deal with preemption. For example, a first flow can preempt a second flow when the required bandwidth is unavailable for the second flow. More particularly, in one embodiment, if there is insufficient bandwidth to create a VoD/IPTV PQoS flow, one or multiple existing DVR flows are preempted to make bandwidth. In an alternative embodiment, other prioritization mechanisms can be used that will be apparent to those skilled in the art.

In another example, one DVR flow preempts another DVR flow where the policy sets forth the order of importance of each DVR flow. Such a policy is defined with either of: 1) A list of destination node MAC address (representing viewers) with decreasing importance; 2) A list of source node MAC address (representing sources) with decreasing importance; and 3) and an indicator indicating which list is to be used. Flow preemption may be done automatically or through user interaction.

The policy can also set forth parameters for flow creation. For example, in one embodiment, the NC will only allow PQoS creation initiated by the BHR, the DVRs, and the Premium ECBs (e.g., MSO-provided, but not retail devices/ECBs). Prioritized QoS and PQoS can also be handled by the policy. For Prioritized QoS, the priority level is managed in a distributed way by applications. Each source node tags its packets with an appropriate priority. In some embodiments, retail ECBs will get a low priority over MoCA. For Parameterized QoS, VoD/IPTV flows can be configured to preempt DVR flows.

A QoS manager can also be provided to manage topology updates, manage preemption and invoke flow transactions. The QoS manager and policy holder are logic entities, and may be located anywhere in the network, such as within the BHR or DVRs. If there is no BHR in the network and no policies have been established, a default policy is used by the DVRs to create PQoS flows on a first-come-first-serve basis.

In some embodiments ECBs are classified into two categories: retail ECBs and MSO ECBs. Retail ECBs are not under the control of the MSOs. In one embodiment, retail ECBs are not allowed to create or support PQoS flows and traffic that originates from a retail ECB is treated as "besteffort", regardless the VLAN-tag priority or the DSCP field of the packets. That is, the flows created to support the retail ECB are created if there is sufficient bandwidth to support all other flows first.

In one embodiment, MSO ECBs are attached to an STB or DVR and are able to support PQoS flows. Therefore, they support layer-2 discovery or DHCP discovery. MSO ECBs are allowed to create PQoS flows. Layer-2 messages from the the STB or DVR can trigger the PQoS flow management. Preferably, the layer-2 message is a one-hop message with a well-known MAC address. The ECB will consume the layer-2 message without forwarding it. Furthermore, traffic that originates from a premium ECB is treated as though it is of the corresponding class of QoS (PQoS, Priority 1, 2, 3).

Figure 10:
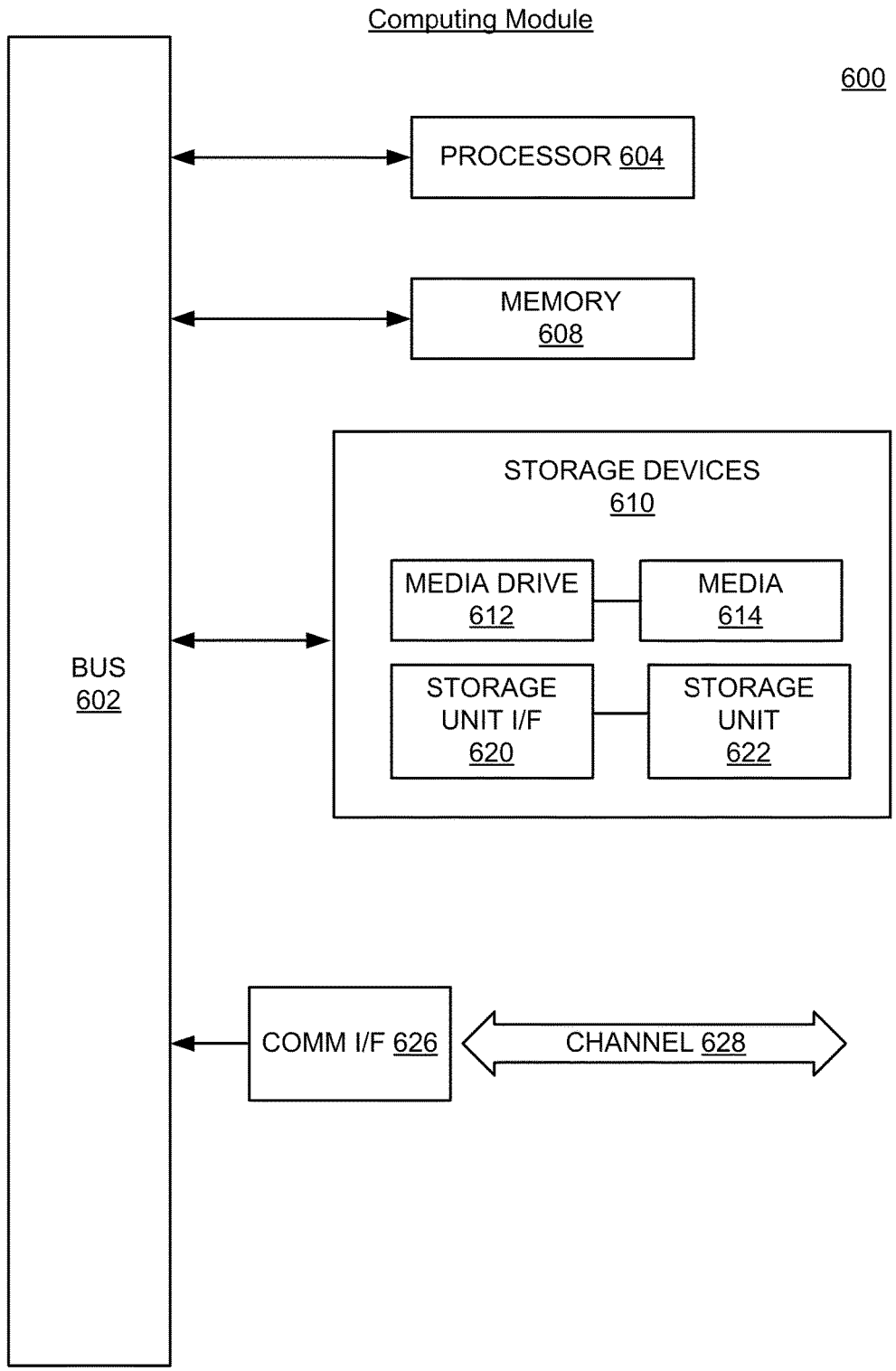
FIG. 10 is a diagram illustrating an example computing module that may be used in implementing various features of embodiments of the disclosed systems and methods.

In one embodiment, when components or modules are implemented in whole or in part using software, these software elements can be implemented using any computing or processing module capable of carrying out the described functionality. One example of such a computing module is shown in FIG. 10. Various embodiments of the disclosed method and apparatus include this computing module 600. After reading this description, it will become apparent to a person skilled in the relevant art how to implement the disclosed method and apparatus using both this computing module and other computing modules or architectures as well.

Referring now to FIG. 10, in one embodiment, the computing module 600 may represent computing or processing capabilities found within: desktop, laptop, notebook computers, hand-held computing devices (PDA's, smart phones, cell phones, palmtops, etc.), mainframe computers, supercomputers, workstations, servers, or any other type of special-purpose or general-purpose computing devices, as may be desirable or appropriate to perform the described functionality for a given application or environment. The computing module 600 might also represent computing capabilities embedded within or otherwise available to a given device. For example, a computing module 600 might be found in or implemented by electronic devices such as digital cameras, navigation systems, cellular telephones, portable computing devices, modems, routers, wireless access points (WAPs), terminals and other electronic devices that might include some form of processing capability.

The computing module 600 might include, for example, one or more processors, controllers, control modules, or other processing devices, such as a processor 604. The processor 604 might be implemented using a general-purpose or special-purpose processing engine such as, for example, a microprocessor, controller, or other control logic. In the illustrated example, the processor 604 is connected to a bus 602, although any communication medium can be used to facilitate interaction with other components of the computing module 600 or to communicate externally.

The computing module 600 might also include one or more memory modules, simply referred to herein as the main memory 608. In one embodiment, random access memory (RAM) or other dynamic memory might be used for storing information and instructions to be executed by the processor 604. The main memory 608 might also be used for storing temporary variables or other intermediate information during execution of instructions to be executed by the processor 604. The computing module 600 might likewise include a read only memory ("ROM") or other storage device coupled to bus 602 for storing information and instructions for the processor 604.

The computing module 600 might also include one or more mechanisms for information storage 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into the computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to the computing module 600.

The computing module 600 might also include a communications interface 624. Communications interface 624 might be used to allow software and data to be transferred between the computing module 600 and external devices. Examples of communications interface 624 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

It should be clear from the broad scope of processing and storage devices disclosed, that any devices that can perform the functions disclosed would be within the scope of the disclosed method and apparatus.

In this document, the terms "computer program medium" and "computer usable medium" are used to generally refer to physical storage media such as, for example, memory 608, storage unit 620, and media 614. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A method for establishing a Parameterized Quality of Service (PQoS) flow comprising:
   a) discovering at least one network node;
   b) classifying the at least one discovered network node as a network node that either supports PQoS flows or does not support PQoS flows, based on a node type;
   c) determining, from the classification:
      which of the at least one network nodes is a source node for PQoS flows; and
      which of the at least one network nodes are designated for supporting PQoS flows; and
   d) invoking a request to create PQoS flows between each of the nodes determined to be a source node and each of the nodes determined to be designated for supporting PQoS flows;
      wherein a bandwidth designated for an individual PQoS flows is computed such that an actual aggregate bandwidth for the PQoS flows does not exceed a network bandwidth available for PQoS flows.

2. The method of claim 1, further comprising limiting each of a set of aggregated downstream PQoS flow bandwidths to levels that ensure that an aggregate bandwidth designated for all of the PQoS flows does not exceed the network bandwidth available for PQoS flows.

3. The method of claim 1, wherein a) through d) are performed by a network controller.

4. The method of claim 1, wherein a) through d) are performed by a designated Quality of Service (QoS) manager node.

5. The method of claim 4, wherein in step d), the designated QoS manager node specifies an actual bandwidth for each PQoS flow when it creates such a flow, so that the aggregate bandwidth of all PQoS flows does not exceed the network bandwidth available for PQOS flows.

6. The method of claim 1, some existing PQoS flows are preempted to release bandwidth or a new flow.

7. The method of claim 4, wherein the designated QoS manager node is broadband home router in a home network.

8. The method of claim 4, wherein the designated QoS manager node is a home gateway.

9. The method of claim 4, wherein the designated QoS manager node is a digital video recorder (DVR) node.

10. The method of claim 4, wherein the designated QoS manager node invokes a request to a MoCA layer to create a downstream PQoS flow from a broadband home router (BHR) to a set top box (STB) or DVR for the STB to receive internet protocol television (IPTV) or video on demand (VoD) content.

11. The method of claim 10, wherein a server is a VoD server.

12. The method of claim 10, wherein a server is an IPTV server.

13. The method of claim 10, wherein, the designated QoS manager node creates an upstream PQoS flow from the STB to the BHR for the STB to send control messages to a server.

14. The method of claim 4, further comprising the designated QoS manager node invoking a request to a MoCA layer to create a PQoS flow from a DVR to a STB for the DVR to provide recorded content to the STB.

15. The method of claim 4, further comprising the designated QoS manager node issuing a request to the MoCA layer to delete a PQoS flow for a specified network node once the specified network node has disconnected from the network.

16. The method of claim 4, further comprising the designated QoS manager node using an access control list containing a list of MAC addresses identifying devices that support PQoS flows.

17. The method of claim 16, wherein the Designated QoS Manager Node preempts at least one PQoS flow when there is a shortage of PQoS bandwidth.

18. The method of claim 17, wherein the preemption is done in accordance with preemption rules.

19. A system, comprising:
   a) a plurality of network nodes on a communications network; and
   b) a designated Quality of Service (QoS) manager node on the communications network, the designated QoS manager node comprising a processor and a computer executable program code embodied on a computer readable medium, the executable program code, when executed by the processor causing the designated QoS manager node to perform the operations of:
      i) discovering at least one of the plurality of network nodes;
      ii) classifying the discovered network node as a network node that either supports Parameterized Quality of Service (PQoS) flows or does not support PQoS flows, based on node type;
      iii) determining from the classification which nodes support PQoS flows;
      iv) determining from the classification which nodes are the sources and which are the destinations for PQoS flows; and
      v) invoking a request to a MoCA layer to create PQoS flows between each of the source nodes and each of the network nodes classified as supporting PQoS flows;
      wherein a bandwidth designated for an individual PQoS flows is determined by the designated QoS manager node such that an actual aggregate bandwidth for the PQoS flows does not exceed a network bandwidth available for PQoS flows.

20. The system of claim 19, wherein i)-v) are performed on a single node when a new node is added to the network, and wherein v) further comprises the designated QoS manager node recomputing the bandwidth designated for the individual PQoS flows such that an aggregate bandwidth for the PQoS flows does not exceed the network bandwidth available for PQoS flows.

21. The system of claim 19, wherein in v), the designated QoS manager node specifies a nominal bandwidth for each PQoS flow when it creates such a flow, so that an aggregate bandwidth of all PQoS flows does not exceed the network bandwidth available for PQOS flows.

22. The system of claim 19, wherein in v) the designated QoS manager node specifies an actual bandwidth for each PQoS flow when the designated QoS manager node creates each PQoS flow, so that an aggregate bandwidth of all PQoS flows does not exceed the network bandwidth available for PQoS flows.

23. The system of claim 20, wherein when there is a shortage of PQoS bandwidth, the designated QoS manager node preempts some existing PQoS flows to release bandwidth for a new flow.

24. The system of claim 19, wherein the designated QoS manager node is a network controller.

25. The system of claim 19, wherein designated QoS manager node is a broadband home router in a home network.

26. The system of claim 19, wherein the designated QoS manager node is a home gateway.

27. The system of claim 19, wherein the designated QoS manager node is a DVR node.

28. The system of claim 19, wherein the designated QoS manager node invokes a request to a MoCA layer to create a downstream PQoS flow for a STB to receive video content.

29. The system of claim 19, wherein the designated QoS manager node creates an upstream PQoS flow for a STB to send control messages to a server.

30. The system of claim 19, wherein the designated QoS manager node invokes a request to a MoCA layer to create a PQoS flow from a DVR to a STB that allows the DVR to provide recorded content to the STB.

31. The system of claim 19 wherein the designated QoS manager node reserves a PQoS flow for a STB to send control messages to the DVR.

32. The system of claim 19, further comprising the designated QoS manager node issuing a request to the MoCA layer to delete a PQoS flow for a network node once that network node has been disconnected from the network.

33. The system of claim 19, wherein node types are selected from the list including a HD Digital Video Recorder (DVR), an SD DVR, a HD Set-top Box (STB), an SD STB, a premium an Ethernet to MoCA (or Coax) Bridge (ECB), a retail ECB, and a Broadband Home Router (BHR).

34. The system of claim 19, wherein the designed QoS manager node has an access control listing containing a list of MAC addresses identifying devices designated for supporting PQoS flows.

* * * * *